United States Patent
Ruigrok et al.

(10) Patent No.: US 6,205,007 B1
(45) Date of Patent: Mar. 20, 2001

(54) THIN-FILM MAGNETIC HEAD AND METHOD OF MANUFACTURING THE MAGNETIC HEAD

(75) Inventors: Jacobus J. M. Ruigrok; Pieter J. Van Der Zaag; Wiepke Folkerts; Lambertus Postma; Ronald M. Wolf; Johannes F. M. Cillessen, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/156,146

(22) Filed: Nov. 22, 1993

(51) Int. Cl.[7] ................................................. G11B 5/127
(52) U.S. Cl. ............................................. 360/313; 360/321
(58) Field of Search .................................... 360/113, 126, 360/121, 125, 313, 321

(56) References Cited

U.S. PATENT DOCUMENTS

| 4,425,593 | 1/1984 | Postma . |
| 5,032,945 | * 7/1991 | Argule et al. ........................... 360/126 |
| 5,331,728 | * 7/1994 | Argule et al. ........................... 360/120 |

OTHER PUBLICATIONS

"Some Interesting Properties of Polycrystalline Garnets Containing $Co^{2+}$ Ions", by J. Nicholas et al, pp. 608–610, IEEE Trans. vol. Mag. 6, No. 3, Sep. 1970.

"Evidence for Very High Magnetic Permeability in the Ferrimagnetic Garnet Structure", by H. Pascard et al, pp. L23–L28, Journ. of Magn. and Magn. Materials, 1993.

* cited by examiner

Primary Examiner—Allen T. Cao
(74) Attorney, Agent, or Firm—Michael E. Belk

(57) ABSTRACT

Thin-film magnetic head having a head face (103) and comprising a magnetoresistive element (109) oriented transversely to the head face and a flux-guiding element (107) of a magnetically permeable material terminating in the head face. A peripheral area (109a) of the magnetoresistive element extending parallel to the head face is present opposite the flux-guiding element for forming a magnetic connection between the magnetoresistive element and the flux-guiding element. The flux-guiding element and the peripheral area of the magnetoresistive element constitute a common magnetic contact face (111), while the magnetically permeable material of the flux-guiding element is electrically insulating.

12 Claims, 3 Drawing Sheets

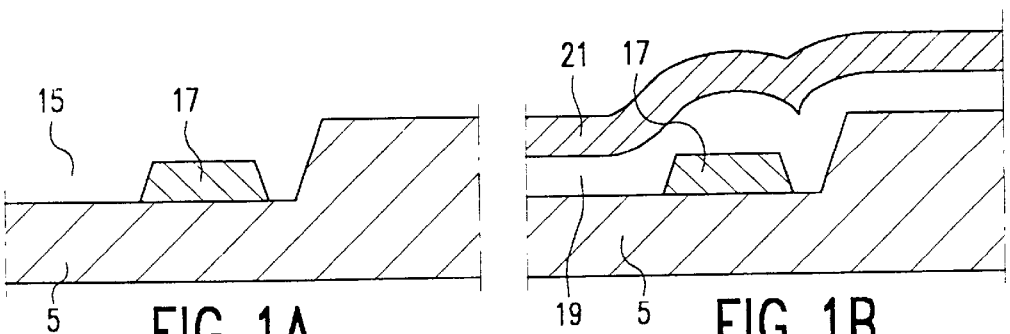
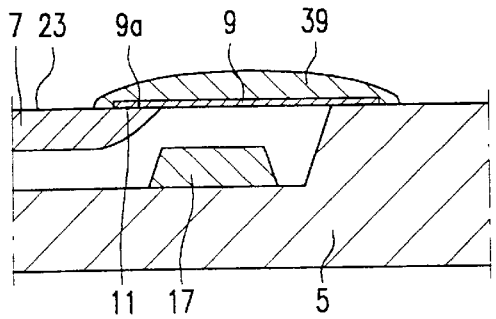
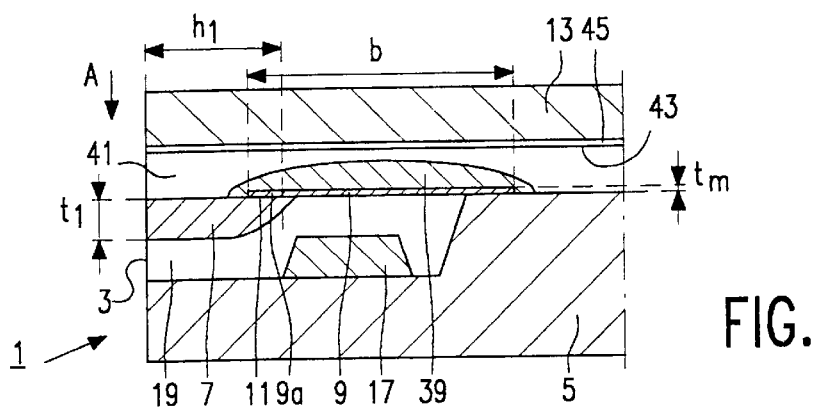
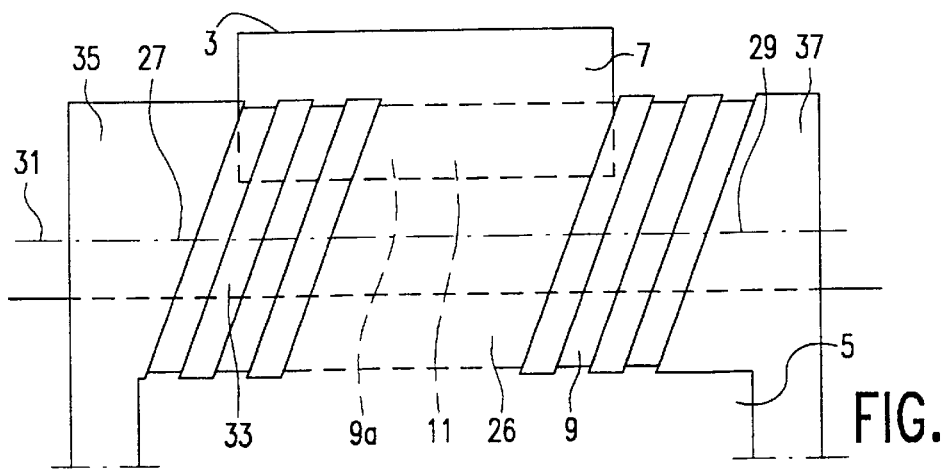

THIN-FILM MAGNETIC HEAD AND METHOD OF MANUFACTURING THE MAGNETIC HEAD

BACKGROUND OF THE INVENTION

The invention relates to a thin-film magnetic head having a head face and comprising a magnetoresistive element oriented transversely to the head face and a flux-guiding element of a magnetically permeable material terminating in the head face, a peripheral area of the magnetoresistive element extending parallel to the head face being present opposite the flux-guiding element for forming a magnetic connection between the magnetoresistive element and the flux-guiding element.

A magnetic head of this type is known from U.S. Pat. No. 4,425,593, herewith incorporated by reference. The known magnetic head is a read head which is used for detecting magnetic fields representing information on a magnetic recording medium moving with respect to the magnetic head, particularly a magnetic tape. The magnetic head comprises a ferrite substrate which constitutes a magnetic yoke together with two aligned layer-shaped flux guides of a nickel-iron alloy. The magnetic head also comprises an elongate layer-shaped magnetoresistive element (MR element) provided with equipotential strips, which element has contact faces at two opposite ends and has such a magnetic anisotropy that the easy axis of magnetization at least substantially coincides with its longitudinal axis. The MR element is arranged within the magnetic yoke in such a way that a gap present between the flux guides is bridged by the MR element. The flux guides have facing end portions which are present opposite peripheral areas of the MR element extending parallel to the longitudinal axis. A quartz insulation layer extends between the ferrite substrate and the electrically conducting MR element and between the MR element and the electrically conducting flux guides. In the known magnetic head a non-magnetic material is thus present in the overlap areas constituted by the peripheral areas of the MR element and the facing end portions of the flux guides.

A drawback of the known magnetic head is that, due to the distance between the peripheral areas of the MR element, which distance is caused by the non-magnetic material, and the opposite end portions of the flux guides, only a small part of the magnetic flux originating from the magnetic recording medium is actually passed through the MR element. In other words, the known magnetic head has a low efficiency.

OBJECTS AND SUMMARY OF THE INVENTION

It is an object of the invention to improve the efficiency of the magnetic head mentioned in the opening paragraph.

To this end the magnetic head according to the invention is characterized in that the peripheral area of the magnetoresistive element and the flux-guiding element constitute a common magnetic contact face, the magnetically permeable material of the flux-guiding element being electrically insulating. Consequently, in the magnetic head according to the invention a flux-guiding element of an electrically insulating material is used, with the peripheral area of the magnetoresistive element (MR element) engaging an end portion of the flux-guiding element directly, i.e. without any intermediate layer. This results in a direct magnetic coupling between the MR element and the flux-guiding element, which leads to an achievable high efficiency. It has been found that an increase of the efficiency by a factor of 3 is feasible as compared with the efficiency of the known magnetic head. Similarly as in the known magnetic head, the MR element of the magnetic head according to the invention has contact faces.

The required resistivity of the magnetically permeable material of the flux-guiding element is substantially determined by the admissible loss of sensitivity resulting from a possible modification of the resistance between the contact faces of the MR element due to the direct connection between the MR element and the flux-guiding element. In this respect it has been found that reasonable to very good results can be achieved if the material of the flux-guiding element is an oxidic soft-magnetic material. For example, the reasonably electrically insulating ferrite $Fe_3O_4$ is suitable for use as a material for the flux-guiding element. It is true that this causes a small decrease of the resistance between the contact faces of the MR element, but this decrease does not lead to unacceptable losses of sensitivity in the case of suitably chosen dimensions. However, an embodiment of the magnetic head according to the invention is preferred in which the oxidic soft-magnetic material is an MnZn ferrite or an NiZn ferrite. These ferrites have such a high resistivity that losses of sensitivity due to the flux-guiding element being in electrical contact with the MR element cannot be observed in practice.

It is to be noted that the magnetic head according to the invention provided with a flux-guiding element of ferrite has the further advantage that the corrosion and wear resistance of the head face are improved with respect to a head face of a known magnetic head provided with a metal flux guide.

An embodiment of the magnetic head according to the invention is characterized in that the oxidic soft-magnetic material is a garnet. Garnets form a group of materials that are very suitable for use as magnetic flux conductors. They possess proper mechanical and electrical properties, while the magnetic properties can be tuned by adding dopants to reduce the magnetic anisotropy. The chemical properties of garnets facilitate deposition in thin film form of the compounds in the proper oxygen state. A suitable material is Co/Si doped YIG ($Y_3Fe_5O_{12}$) described in IEEE Transactions on Magnetics, Vol. Mag. 6, no. 3, Sept. 1970, Nicolas et al, p. 608–610 (herewith incorporated by reference), which material has a magnetic permeability of at least 500. Other doped garnets e.g. disclosed in Journal of Magnetism and Magnetic Materials 125 (1993) L23–28, Pascard et al (herewith incorporated by reference) are also suitable.

An embodiment of the magnetic head according to the invention is characterized in that the MR element terminates in the head face, with the flux-guiding element being formed by a substrate. In this embodiment the MR element is directly provided on the substrate comprising preferably MnZn ferrite or NiZn ferrite. Also in this embodiment there are small magnetic and electrical losses.

An embodiment of the magnetic head according to the invention, which has a satisfactory efficiency and at least a reasonable, practically usable sensitivity, is characterized in that the magnetically permeable material of the flux-guiding element satisfies the condition $$\rho_f = c \cdot \left( \frac{t_1 \cdot h_1}{t_m \cdot b} \right) \cdot \rho_m$$

in which
c is a numerical value of more than ⅓,
$\rho_f$ is the resistivity of the material of the flux-guiding element
$\rho_m$ is the resistivity of the material of the magnetoresistive element, $t_1$ is the thickness, viewed in a direction transverse to the magnetoresistive element, of the flux-guiding element, $t_m$ is the thickness of the magnetoresistive element, $h_1$ is the height, viewed from the head face, of the flux-guiding element and b is the width, viewed in a direction transverse to the head face, of the magnetoresistive element.

A modification of the last-mentioned embodiment, in which the magnetoresistive element has a further peripheral portion located opposite said peripheral portion and opposite a further flux-guiding element of a magnetically permeable material, is characterized in that the further peripheral portion of the magnetoresistive element and the further flux-guiding element constitute a common further magnetic contact face, the magnetically permeable material of the flux-guiding element and the further flux-guiding element satisfying the condition $$\rho_f = c \cdot \left( \frac{t_1 \cdot h_1 + t_2 \cdot h_2}{t_m \cdot b} \right) \cdot \rho_m$$

in which c is a numerical value of more than ⅓, $\rho_f$ is the resistivity of the magnetically permeable material, $\rho_m$ is the resistivity of the material of the magnetoresistive element, $t_1$ and $t_2$ are the thicknesses, viewed in a direction transverse to the magnetoresistive element, of the flux-guiding element and of the further flux-guiding element, respectively, $h_1$ is the height, viewed and measured from the head face, of the flux-guiding element, $h_2$ is the height, viewed from the head face and measured from the magnetoresistive element, of the further flux-guiding element, or the width, measured parallel to the head face, of the further flux-guiding element if this width is smaller than the height of the further flux-guiding element, and b is the width, viewed in a direction transverse to the head face, of the magnetoresistive element.

An embodiment of the magnetic head according to the invention having a high efficiency and an eminent sensitivity is characterized in that said numerical value c is larger than 3.

Another object of the invention is to provide a simple method of manufacturing the magnetic head comprising a small number of process steps.

The method according to the invention, in which a thin-film structure provided with the magnetoresistive element and the flux-guiding element is formed, is characterized in that a layer of oxidic soft-magnetic material for forming the flux-guiding element is provided, in which method an intermediate structure is obtained which is flattened, whereafter a layer of a magnetically and electrically conducting material for forming the magnetoresistive element is provided, a layer portion constituting the peripheral portion of the magnetoresistive element being directly deposited on a flattened portion of the layer of the oxidic soft-magnetic material. The thin-film structure may be provided on a substrate, preferably a ferrite substrate. The oxidic soft-magnetic material may be provided by means of known techniques, such as sputtering, metal-organic chemical vapour deposition (MO-CVD) or laser ablation. A ferrite, particularly an MnZn ferrite or an NiZn ferrite, or a garnet, for example Co/Si-doped YIG, is preferably used as the oxidic soft-magnetic material.

An embodiment of the method according to the invention with which mechanical stresses in the magnetoresistive element are inhibited is characterized in that a layer of a synthetic resin, for example a photosensitive polymer, is provided across the magnetoresistive element after formation of the magnetoresistive element.

BRIEF DESCRIPTION OF THE DRAWING

The afore-mentioned and other aspects of the invention will be apparent from the embodiments described hereinafter and elucidated with reference to drawings, in which:

FIGS. 1D and E show a first embodiment of the magnetic head according to the invention and FIGS. 1A to C show stages of manufacture of this embodiment.

DESCRIPTION OF THE PREFERRED EMBODIMENTS

Figure 2:
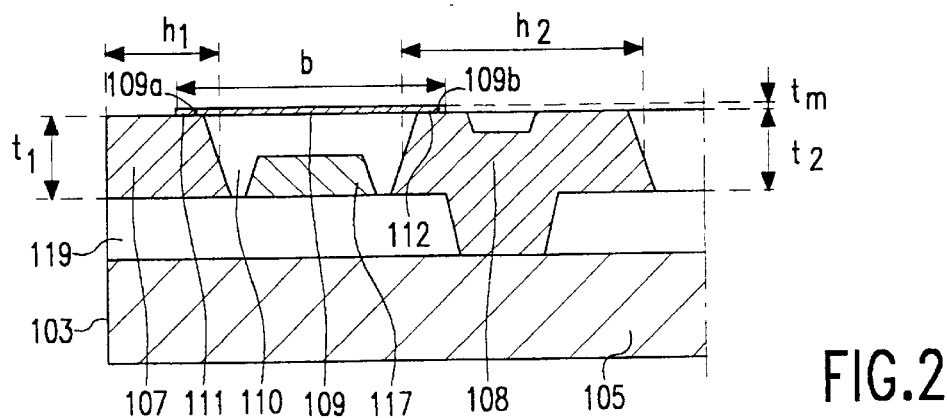
FIG. 2 shows a second embodiment of the magnetic head according to the invention FIGS. 3A and B show a third embodiment of the magnetic head according to the invention.

It is to be noted that the embodiments are diagrammatical and that the Figures are drawn to arbitrary scales which do not always correspond to each other.

The thin-film magnetic head according to the invention shown in FIG. 1 has a head face 3 along or across which a magnetic recording medium, particularly a magnetic tape can be guided, for example, in a direction A. The magnetic head 1 has a ferrite substrate 5, for example of an MnZn ferrite or an NiZn ferrite on which a thin-film structure is provided. Substrate 5 forming a flat shield and an upwardly extending first component. The thin-film structure comprises a flux-guiding element 7 (second component) of an oxidic soft-magnetic material, in this example $Fe_3O_4$, terminating in the head face 3, and a magnetoresistive element (MR element) 9, for example an NiFe alloy which has a common magnetic contact face 11 with the flux-guiding element 7. A protective element 13, usually referred to as the counter-block of, for example a ceramic material such as barium titanate, is present on the thin-film structure.

An embodiment of the method according to the invention will be described in greater detail with reference to parts FIG. 1A to E. This method may start from the ferrite substrate 5 in which a recess 15 is made by reactive ion etching. An electrically conducting layer 17, preferably of Au, is provided in the recess 15 by consecutive sputter deposition and sputter etching so as to form a bias winding for biasing the MR element 9. Instead of sputter etching, wet chemical etching may alternatively be used. Subsequently, an electrically insulating layer 19 (separating structure), preferably of an oxidic material such as $ZrO_2$, is formed, preferably by sputter deposition. Layers of Mo may be present between the conducting layer 17 and the ferrite substrate 5 and the oxidic layer 19 so as to improve the adhesion.

A magnetically permeable, but electrically insulating layer 21, eg., $Fe_3O_4$, is provided on layer 19, preferably by laser ablation with the layer 19 and the substrate 5, the layer 21 is flattened to form surface 23 by appropriate means such as polishing, whereby the flux-guiding element 7 is structured. A magnetoresistive material, for example NiFe is provided, preferably by sputter deposition, or vapour deposition on the flat surface 23 thus obtained and is structured to form the MR element 9.

Since the NiFe is directly deposited on the flux-guiding element 7, a peripheral area 9a of the MR element 9 situated opposite the flux-guiding element 7 form a common magnetic contact face 11 with the flux-guiding element 7. The MR element 9 also has a direct magnetic connection in an area 26 with the magnetically permeable substrate 5.

The elongate MR element 9 has a longitudinal axis 31 extending from one end portion 27 to another end portion 29, which longitudinal axis is parallel or approximately parallel to an easy axis of magnetization. Equipotential strips 33 having a satisfactory electrical conductance and connection faces or contact faces 35 and 37 of, for example Au are structured on the MR element 9.

The equipotential strips 33 are provided at an angle of preferably 45° to the longitudinal axis 31. During operation the equipotential strips 33 ensure that a measuring current applied to the MR element 9 flows at an angle to the easy axis of magnetization for the purpose of linearizing the behaviour of the MR element. Under the influence of a magnetic field of a record carrier moving along the magnetic head 1, the resistance of the parts of the MR element 9 located between the equipotential strips 33 changes depending on the extent to which the direction of magnetization coincides with the current direction in the MR element. The afore-mentioned bias winding formed by the layer 17 is used for further improvement of the linearity of the MR element behaviour.

After the MR element 9 and the equipotential strips 33 have been formed, a photolacquer, particularly a polymer, is provided across the MR element which after exposure and heating, for example to 220° C. forms a chemically inert layer 39 having a convex meniscus. Subsequently an electrically insulating oxide layer 41, preferably of $ZrO_2$, is formed, preferably by sputter deposition. The layer 41 is then flattened, for example by lapping and polishing, so as to form an adhesive face 43 on which the counterblock 13 is secured via a glue 45. Finally, the head face 3 is formed by means of operations such as grinding and polishing.

The ferrite $Fe_3O_4$, which is used as a material for the flux-guiding element 7 of the magnetic head according to the invention shown in FIG. 1, has a satisfactory magnetic permeability and a resistivity of approximately $10^{-4}$ $\Omega m$ so that the material can be qualified as a reasonably good electrically insulating material. To ensure at least a sufficient sensitivity of the magnetic head, a number of parameters relating to the magnetic head have been chosen in such a way that the following condition is satisfied:

$$\rho_f = c \cdot \left( \frac{t_1 \cdot h_1}{t_m \cdot b} \right) \cdot \rho_m$$

In this condition, c is a numerical value of more than $\frac{1}{3}$, $\rho_f$ is the resistivity of the $Fe_3O_4$ ferrite of the flux-guiding element 7, $\rho_m$ is the resistivity of the NiFe alloy of the MR element 9, $t_1$ is the thickness of the flux-guiding element 7, $t_m$ is the thickness of the MR element 9, $h_1$ is the height of the flux-guiding element 7 and b is the width of the MR element. If an MnZn ferrite or an NiZn ferrite having a resistivity of approximately 1 $\Omega m$ and approximately $10^5$ $\Omega m$, respectively, is used instead of the $Fe_3O_4$ ferrite, a numerical value c which is larger or much larger than 3 is readily possible so that not only a high efficiency but also an eminent sensitivity can be achieved.

The thin-film magnetic head according to the invention shown in FIG. 2 has a head face 103 and a ferrite substrate 105 the head is a transducing structure. The head also includes a flux-guiding element 107 (hereinafter referred to as first flux guide 107) terminating in the head face 103 and a further flux-guiding element 108 (hereinafter referred to as second flux guide 108) spaced away therefrom. The flux guides 107 and 108 which are each manufactured of an MnZn ferrite or an NiZn ferrite, are separated from each other by a space 110 which is bridged by an MR element 109 provided on the flux guides without an insulating intermediate layer. The MR element 109 has two mutually parallel peripheral areas 109a and 109b extending longitudinally to the MR element and parallel to the head face 103, which peripheral areas constitute common magnetic contact faces 111 and 112, respectively, with the flux guides 107 and 108. The second flux guide 108 is magnetically connected to the magnetically permeable substrate 105 for creating a magnetic yoke having the shape of a tuning fork.

The magnetic head shown in FIG. 2 is dimensioned in such a way that it satisfies the condition $$\rho_f = c \cdot \left( \frac{t_1 \cdot h_1 + t_2 \cdot h_2}{t_m \cdot b} \right) \cdot \rho_m.$$

In this condition, c is a numerical value of more than 3, $\rho_f$ is the resistivity of the ferrite used in the flux guides 107 and 108, $\rho_m$ is the resistivity of the material of the MR element 109, $t_1$ is the thickness of the first flux guide 107, $t_2$ is the thickness of the second flux guide 108, $h_1$ is the height of the flux guide 107, $h_2$ is the height of the flux guide 108 and b is the width of the MR element 109.

It is to be noted that an electrically insulating layer 119 of, for example $SiO_2$ or $ZrO_2$ terminating in the head face 103 extends in the tuning fork-shaped magnetic yoke which is formed by the first flux guide 107, the MR element 109, the second flux guide 108 and the substrate 105. The space 110, which is provided with a bias winding 117, is also filled with an electrically insulating material such as $SiO_2$.

Figure 3A:
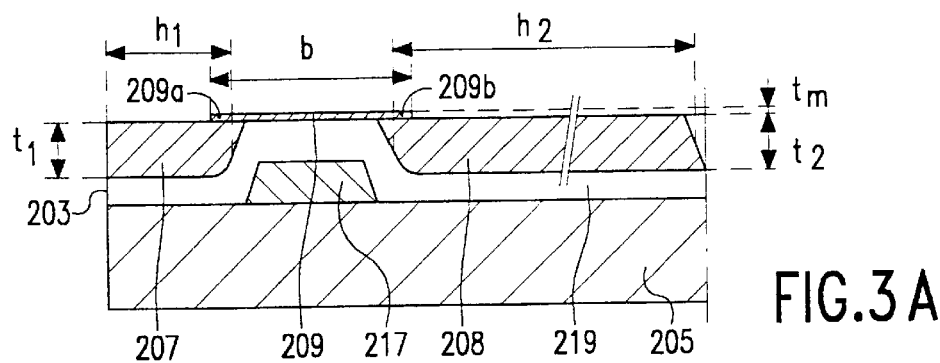
Figure 3B:
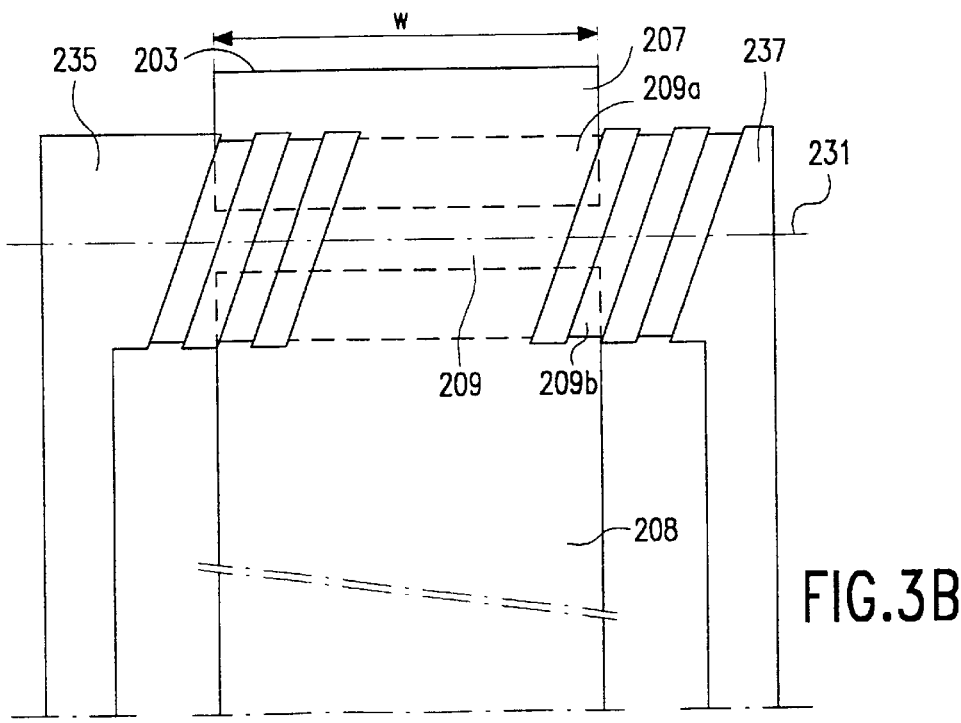

The thin-film magnetic head according to the invention shown in FIG. 3 is closely related to the magnetic head shown in FIG. 2. The magnetic head has a ferrite substrate 205 on which an electric winding 217 and an electrically insulating layer 219 are provided. The insulating layer 219 is provided with a flux-guiding element 207 and, spaced away therefrom, a further flux-guiding element 208, the flux-guiding element 207 adjoining a contact face or head face 203. The flux-guiding elements 207 and 208 are made of an oxidic soft-magnetic material, preferably an MnZn ferrite or an NiZn ferrite and consequently have good magnetic properties and good electrically insulating properties. The insulating layer 219 is further provided with an MR element 209 having a longitudinal axis 231 and a peripheral area 209a being directly provided on the flux-guiding element 207 and a further peripheral area 209b being directly provided on the further flux-guiding element 208. The peripheral areas 209a and 209b extend parallel to the head face 203, i.e. parallel to the longitudinal axis 231 of the MR element 209. The MR element 209 has two electric contact faces 235 and 237 between which the effective part of the MR element extends. The further flux guide 208 has a width w as shown in FIG. 3B, which in this embodiment is smaller than the dimension $h_2^*$ shown in FIG. 3A.

The magnetic head as shown in FIG. 3 satisfies the condition $$\rho_f = c \cdot \left( \frac{t_1 \cdot h_1 + t_2 \cdot h_2}{t_m \cdot b} \right) \cdot \rho_m.$$

In this condition, c is a numerical value of more than ⅓, but preferably larger than 3, $\rho_f$ is the resistivity of the magnetically permeable material of the flux-guiding elements 207 and 208, $\rho_m$ is the resistivity of the material of the MR element 209, $t_1$ and $t_2$ are the thicknesses of the flux-guiding element 207 and the further flux-guiding element 208, respectively, h, is the height of the flux-guiding element 207, $h_2$ is the width w of the further flux guide 208 and b is the width of the MR element 209.

An advantage of the magnetic head shown in FIG. 3 over the magnetic head shown in FIG. 2 is that the insulating layer 219 need not be provided with a connection aperture during manufacture of the magnetic head, which results in an economy of one production step.

Figure 4:
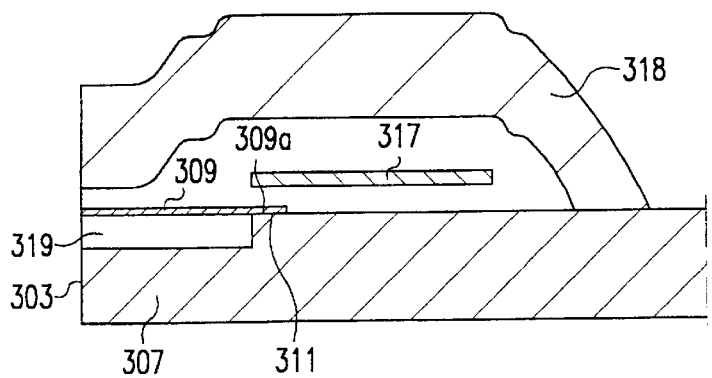
FIG. 4 shows a fourth embodiment of the magnetic head according to the invention and FIG. 5a shows a $\eta$–$\mu_r$ diagram with a first graph related to a fifth embodiment of the magnetic head according to the invention shown in FIG. 5b, and a second graph related to a known magnetic head shown in FIG. 5c.

The magnetic head according to the invention shown in FIG. 4 has a head face 303 and an MR element 309 adjoining the head face 303. The MR element 309 has a thin layer of a magnetically anisotropic material such as NiFe. A peripheral area 309a of the MR element 309 extending longitudinally to the MR element is directly provided on a flux-guiding element 307 of an oxidic soft-magnetic material, particularly an MnZn ferrite or an NiZn ferrite. The MR element 309 and the flux-guiding element 307 thus constitute a common magnetic contact face 311. Consequently, the flux-guiding element 307 not only functions as a magnetic flux guide but also as a substrate and is provided with a recess 319 which is filled with an electrically insulating material, for example $ZrO_2$ or $SiO_2$.

The magnetic head shown in FIG. 4 is also provided with an electrically conducting winding 317 which can be used particularly for performing a write function. Together with a flux-guiding layer 318, the flux-guiding element 307 constitutes a magnetic yoke for the magnetic flux generated by a current flowing through the write winding 317. The MR element 309, the winding 317 and the layer 318 are mutually insulated by an electrically insulating material such as $ZrO_2$ or $SiO_2$.

Figure 5A:
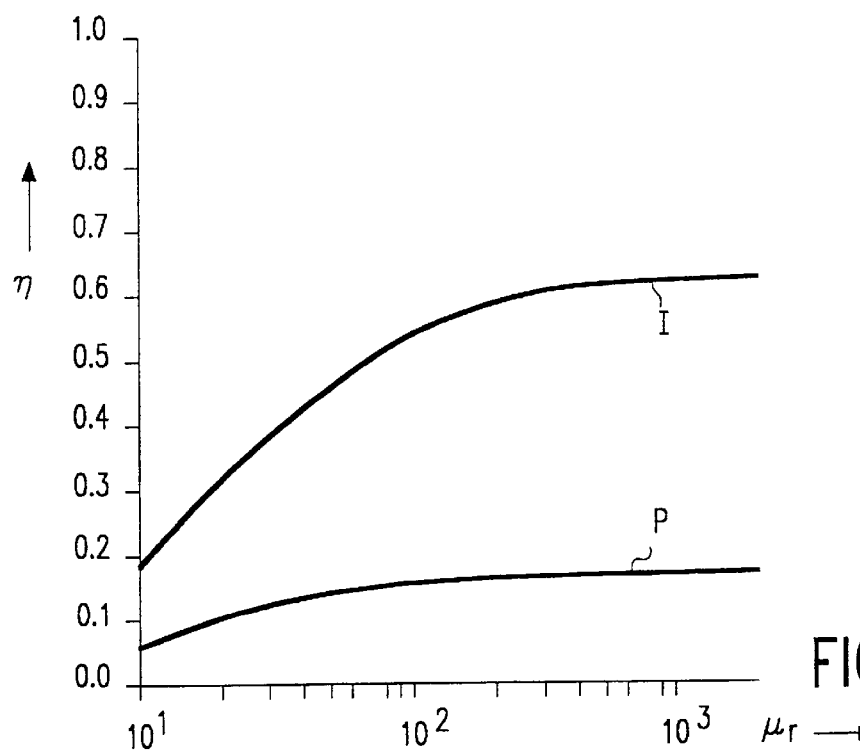
Figure 5B:
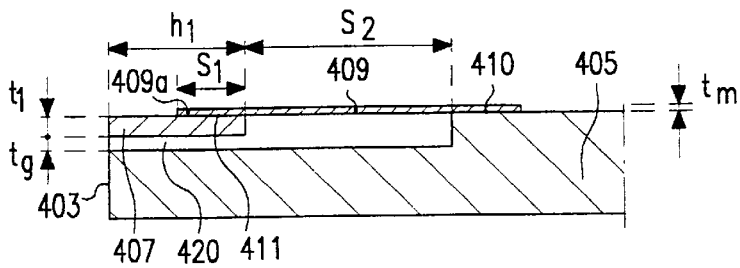

A curve I in the diagram shown in FIG. 5a shows the relation between the efficiency η and the relative permeability $\mu_r$ of the flux-guiding element of an embodiment of the magnetic head according to the invention. This embodiment, which is of the type as shown in FIG. 1, is shown diagrammatically in FIG. 5b. The magnetic head according to the invention has a head face 403 and includes an MR element 409 oriented transversely to the head face 403 and a flux-guiding element 407 of a magnetically permeable, electrically insulating material terminating in the head face. A peripheral area 409a extending parallel to the head face and being located opposite the flux-guiding element 407 is in direct contact with the flux-guiding element 407 with which it constitutes a common magnetic contact face 411. The material of the flux-guiding element 407 is preferably an oxidic soft-magnetic material, particularly an MnZn ferrite or an NiZn ferrite. A contact portion 410 of the MR element 407 extending parallel to the peripheral area 409a is directly provided on a ferrite substrate 405. A transducing gap constituted by an electric insulation layer 420 extends between the ferrite substrate 405 and the flux-guiding element 407. Some dimensions of the magnetic head are: $t_1$=0.5 μm; $t_g$=0.4 μm; $t_m$=0.05 μm; $h_1$=3 μm; $s_1$=2 μm; $s_2$=5 μm.

Figure 5C:
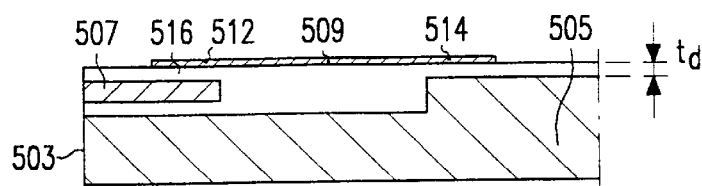

FIG. 5c shows a magnetic head including a head face 503 and a ferrite substrate 505, a flux guide 507 of a magnetically permeable material and an MR element 509. The MR element 509 has peripheral portions 512 and 514 situated opposite the flux guide 507 and the substrate 505, an electric insulation layer 516 of, for example quartz and having a thickness $t_d$ of 0.5 μm extending between the flux guide 507 and the substrate 505 on the one hand and the peripheral portions 512 and 514 of the MR element 509 on the other hand. The peripheral portions 512 and 514 are thus spaced away from the flux guide 507 and the substrate 505, respectively, so that during operation magnetic flux can reach the MR element 509 only via the insulation layer 516. The dimensions of this magnetic head further correspond to those of the magnetic head according to the invention shown in FIG. 5b.

FIG. 5a shows a curve P in the above-mentioned diagram indicating the relation between the efficiency η of the magnetic head shown in FIG. 5c and the relative permeability $\mu_r$ of the soft-magnetic material of the flux guide 507. The diagram clearly demonstrates the efficiency improvement of the magnetic head according to the invention as compared with the efficiency of the other magnetic head.

It is to be noted that the invention is not limited to the embodiments shown. The scope of the invention provides various other embodiments, notably by using different materials, for example, the use of an LiZn ferrite or an MgMnZn ferrite as an oxidic soft-magnetic material, and other designs. Instead of a magnetically permeable substrate, a non-magnetic substrate provided with a magnetically permeable layer may be used.

What is claimed is:

1. A thin-film magnetic head having a head face and comprising:

a flux-guiding element of a magnetically permeable material terminating in the head face; and a magnetoresistive element oriented transversely to the head face, a peripheral area of the magnetoresistive element extending parallel to the head face and opposite the flux-guiding element for forming a magnetic connection between the magnetoresistive element and the flux-guiding element, and in which:

the flux-guiding element and the peripheral area of the magnetoresistive element constitute a common magnetic contact face;

the magnetically permeable material of the flux-guiding element is electrically insulating; and the magnetically permeable material of the flux-guiding element satisfies the condition:

$$\rho_f = c \cdot \left( \frac{t_1 \cdot h_1}{t_m \cdot b} \right) \cdot \rho_m$$

in which:

c is a numerical value of more than ⅓;
    $r_f$ is the resistivity of the material of the flux-guiding element;
    $r_m$ is the resistivity of the material of the magnetoresistive element;
    $t_1$ is the thickness, viewed in a direction transverse to the magnetoresistive element, of the flux-guiding element;
    $t_m$ is the thickness of the magnetoresistive element;
    $h_1$ is the height, viewed from the head face, of the flux-guiding element; and b is the width, viewed in a direction transverse to the head face, of the magnetoresistive element.

2. The magnetic head of claim 1, in which the material of the flux-guiding element is an oxidic soft-magnetic material.

3. The magnetic head of claim 2, in which the oxidic soft-magnetic material is an MnZn ferrite or an NiZn ferrite.

4. The magnetic head of claim 2, in which the oxidic soft-magnetic material is a garnet.

5. The magnetic head of claim 1, in which:

the flux-guiding element includes a substrate; and the magnetoresistive element terminates in the head face.

6. The magnetic head of claim 1, in which the numerical value c is larger than 3.

7. A thin-film magnetic head having a head face and comprising:

a flux-guiding element of a magnetically permeable material terminating in the head face;

a further flux-guiding element of magnetically permeable material; and a magnetoresistive element oriented transversely to the head face, a peripheral area of the magnetoresistive element extending parallel to the head face and opposite the flux-guiding element for forming a magnetic connection between the magnetoresistive element and the flux-guiding element, and a further peripheral portion located opposite said peripheral portion and opposite the further flux-guiding element;

and in which:

the flux-guiding element and the peripheral area of the magnetoresistive element constitute a common magnetic contact face;

the magnetically permeable material of the flux-guiding element is electrically insulating; and the further peripheral portion of the magnetoresistive element and the further flux-guiding element constitute a common further magnetic contact face, the magnetically permeable material of the flux-guiding element and the further flux-guiding element satisfying the condition:

$$\rho_f = c \cdot \left( \frac{t_1 \cdot h_1 + t_2 \cdot h_2}{t_m \cdot b} \right) \cdot \rho_m$$

in which:

c is a numerical value of more than $\frac{1}{3}$, $r_f$ is the resistivity of the magnetically permeable materials;

$r_m$ is the resistivity of the material of the magnetoresistive element;

$t_1$ and $t_2$ are the thicknesses, viewed in a direction transverse to the magnetoresistive element, of the flux-guiding element and of the further flux-guiding element, respectively;

$h_1$ is the height, viewed and measured from the head face, of the flux-guiding element;

$h_2$ is the height, viewed from the head face and measured from the magnetoresistive element, of the further flux-guiding element, or the width, measured parallel to the head face, of the further flux-guiding element if this width is smaller than the height of the further flux-guiding element; and b is the width, viewed in a direction transverse to the head face, of the magnetoresistive element.

8. The magnetic head of claim 7, in which the numerical value c is larger than 3.

9. The magnetic head of claim 7, in which the material of the flux-guiding element is an oxidic soft-magnetic material.

10. The magnetic head of claim 9, in which the oxidic soft-magnetic material is an MnZn ferrite or an NiZn ferrite.

11. The magnetic head of claim 9, in which the oxidic soft-magnetic material is a garnet.

12. The magnetic head of claim 7, in which: the flux-guiding element includes a substrate; and the magnetoresistive element terminates in the head face.

* * * * *